United States Patent
Swabey

(10) Patent No.: US 8,334,020 B2
(45) Date of Patent: Dec. 18, 2012

(54) IN-MOLD LABELS

(75) Inventor: John William Swabey, Calgary (CA)

(73) Assignee: NOVA Chemicals (International), Fribourg (CH)

( * ) Notice: Subject to any disclaimer, the term of this patent is extended or adjusted under 35 U.S.C. 154(b) by 250 days.

(21) Appl. No.: 12/802,625

(22) Filed: Jun. 10, 2010

(65) Prior Publication Data

US 2010/0323172 A1     Dec. 23, 2010

(30) Foreign Application Priority Data

Jun. 18, 2009   (CA) .................................... 2669441

(51) Int. Cl.
*B05D 3/02*     (2006.01)
(52) U.S. Cl. .................................... 427/384; 427/385.5
(58) Field of Classification Search .................. None
See application file for complete search history.

(56) References Cited

U.S. PATENT DOCUMENTS

| | | | |
|---|---|---|---|
| 5,498,307 A | 3/1996 | Stevenson | |
| 5,840,142 A | 11/1998 | Stevenson et al. | |
| RE37,248 E | 6/2001 | Dudley | |
| 6,815,005 B2 | 11/2004 | Stevenson et al. | |
| 7,128,970 B2 | 10/2006 | Reeves et al. | |
| 2007/0042144 A1* | 2/2007 | Teensma et al. | 428/34.2 |
| 2009/0162620 A1* | 6/2009 | Swabey et al. | 428/195.1 |

FOREIGN PATENT DOCUMENTS

WO   WO 2006/053267 A1   5/2006

* cited by examiner

*Primary Examiner* — Erma Cameron
(74) *Attorney, Agent, or Firm* — Kenneth H. Johnson

(57) ABSTRACT

In-mold labels comprise a printed sheet and a "cover stock" layer that covers the printed sheet and also provides adhesion of the label to the mold prior to the molding procedure. The cover stock is prepared from a blend of a major portion of polymer composition having a high melting point and a lesser amount of a polyolefin having a low melting point. The high melting point polymer composition must contain an ethylene-vinyl acetate (EVA) copolymer having a melting point of greater than 85° C. The cover stock is characterized by having a non-homogeneous morphology in which discrete "islands" of the high melting point polymer are present in a continuous "sea" of the polyolefin. The labels of this invention are especially suitable for applying labels to a rotomolded part. The cover stock melts during the rotomolding process to provide a protective cover for the label graphics.

2 Claims, No Drawings

IN-MOLD LABELS

FIELD OF THE INVENTION

This invention relates to in-mold labels for plastic parts, especially parts that are prepared by rotational molding (or "rotomolding"). The inventive labels are prepared with a novel cover stock that is applied to the mold surface prior to the rotomolding process.

BACKGROUND OF THE INVENTION

Labels, decals and graphics are often applied to the surface of a molded polyolefin article. Labels that are applied to a mold surface prior to the molding process are commonly called in-mold labels. Labels for blow molding are often referred to by those skilled in the art as IML-B, for injection molding as IML-I and for rotational molding as IML-R.

U.S. Pat. No. 5,498,307 (Stevenson) discloses the use of micronized polyethylene and vegetable oil as an adhesive paste for a label in a rotomolding process.

U.S. Pat. No. 5,840,142 (Stevenson et al.) discloses the use of indicia of finely divided polyolefin, wax and pigment with a coating of 1 to 99 percent polyolefins and a binder selected from rosins, hydrocarbon resins and waxes and terpene resins.

U.S. Pat. No. 6,815,005 (Stevenson et al.) discloses the use of thermoplastic powder, binder solid and colorant in a liquid carrier to produce decorative enhancements to polyethylene surface.

U.S. Pat. No. 7,128,970 (Stevenson) discloses a pressure sensitive adhesive with a transition temperature comparable to the demolding temperature in a rotational molding process.

WO 06/053267 (Blackwell et al.) describes in mold labels prepared from a melt blend of polyolefins.

U.S. patent RE37,248 (Dudley) discloses a polymeric adhesive label with a heat activated adhesive substrate for blow molding made of ethylene polymer/copolymer.

SUMMARY OF THE INVENTION

In one embodiment, the present invention provides a cover stock for in-mold labels, where the cover stock is a two-phase polymer layer having a thickness of from 0.5 to 20 mils, said layer comprising:
I) from 60 to 90 weight % of a polymer composition A having a peak melting point of greater than 85° C., wherein said polymer composition A is provided as particles having an average particle size of from 1 to 400 microns and wherein said polymer composition A consists of:
  i) an ethylene-vinyl acetate polymer having a melting point of greater than 85° C. and optionally;
  ii) a polyethylene having a melting point of greater than 85° C.; and
II) from 40 to 10 weight % of a polyolefin B having a peak melting point of less than 70° C., wherein said two-phase layer is characterized by having a morphology wherein said polymer composition A forms a discontinuous phase of discrete particles in a continuous phase of said polyolefin B.

This cover stock may be formed into an in-mold label by, for example, laminating the cover stock on top of a printed sheet. Thus, in another embodiment, the present invention provides a label for a rotomolded part, said label comprising:
1) a graphics film containing an image; and
2) a cover stock comprising a two-phase polymer layer having a thickness of from 0.5 to 20 mils, said layer comprising:
  I) from 60 to 90 weight % of a polymer composition A having a peak melting point of greater than 85° C., wherein said polymer composition A is as defined above; and
  II) from 40 to 10 weight % of a polyolefin B having a peak melting point of less than 70° C., wherein said two-phase layer is characterized by having a morphology wherein said polymer composition A forms a discontinuous phase of discrete particles in a continuous phase of said polyolefin B.

The above-described label is especially suitable for the preparation of an in-mold label for a rotomolded part. Thus, in another embodiment, the present invention provides a process to form a rotomolded part having a molded-in-label, said process comprising:
A) placing in a mold a label for a rotomolded part, said label comprising:
  1) a graphics film containing an image; and
  2) a cover stock comprising a two-phase polymer layer having a thickness of from 0.5 to 20 mils, said layer comprising:
    I) from 60 to 90 weight % of a polymer composition A having a peak melting point of greater than 85° C., wherein said polymer composition A is as defined above; and
    II) from 40 to 10 weight % of a polyolefin B having a peak melting point of less than 70° C., wherein said two-phase layer is characterized by having a morphology wherein said polymer composition A forms a discontinuous phase of discrete particles in a continuous phase of said polyolefin B;
wherein said cover stock is applied to a surface of said mold;
B) filling said mold with rotomoldable plastic; and
C) heating and rotomolding said rotomoldable plastic.

Polymer composition A is an essential element of the present invention. Polymer composition A must contain an ethylene-vinyl acetate (EVA) copolymer having a melting point of greater than 85° C., with the further proviso that this EVA is provided in the form of small particles having an average particle size of from 1 to 400 microns. It is preferred that polymer composition A comprises a blend of two polymers, namely the above described EVA (having a melting point above 85° C. and an average particle size of from 1 to 400 microns) and a polyethylene (which also must have a melting point of greater than 85° C. and a particle size of from 1 to 400 microns).

The above-described (non-homogeneous) morphology of the cover stock is an essential element of the present invention. The morphology may be obtained by a thermal mixing process which is conducted at a temperature that is high enough to melt polyolefin B but not polymer composition A (hence the requirement for the different melting points, as specified above)—then cooling the melt so as to leave "islands" of polymer composition A in a "sea" of polyolefin B. An alternative method to produce this morphology is to 1) mix polymer composition A and polyolefin B in a liquid which is a solvent for polyolefin B but a non-solvent for polyolefin A; then 2) deposit the "solvent-slurry" on a surface; and 3) drive off the liquid to leave a thin film of the non-homogeneous polymer blend (and this method is described in more detail in the examples).

As noted above, another essential element of the present invention is the particle size of polymer composition A, which must be less than 400 microns. More particularly, the average particle size is from 1 to 400 microns (preferably from 1 to 200 microns). Particle size is measured by ASTM D-1921.

(For particle sizes less than about 50 microns, it may be preferable to use a light scattering technique to measure particle size, as disclosed in ISO 13320). Particle sizes greater than 400 microns are to be avoided because they may leave "chunks" or "lumps" in the cover stock film.

DETAILED DESCRIPTION OF PREFERRED EMBODIMENTS

As used herein, the term "cover stock" is used to describe the above defined "two-phase layer" of polymer composition A and polyolefin B having the specified morphology. The cover stock is generally provided as a film having a thickness of from 0.5 to 20 mils (preferably from 0.5 to 10 mils).

Each polymer contained in polymer composition A has a peak melting point as determined by Differential Scanning Calometry (or "DSC") of greater than 85° C. using the DSC test method of ASTM D3418. For clarity, if a polymer has two or more melting points, the maximum melting point is greater than 85° C.

As noted above in the summary of the invention, polymer composition A must contain a specific type of EVA copolymer that is characterized by melting point and particle size. Polymer composition A preferably also contains a polyethylene. It is essential that any polyethylene used as part of polymer composition A has a peak melting point of greater than 85° C.

Suitable examples of polyethylene for use in polymer composition A include "heterogeneous" copolymers of ethylene and an alpha olefin such as butene, hexene or octene (where the term "heterogeneous" means that the copolymer has more than one melting peak as determined by DSC); high density polyethylene having a density of greater than 0.950 grams/cubic centimeter ("g/cc", as determined by ASTM D1505) and a melt index, (as determined by ASTM 1238; conditions of 190° C. and 2.16 kg weight, "$I_2$") of less than 100 grams/10 minutes (preferably from 0.1 to 30 grams/15 minutes); high pressure, low density polyethylene which is produced with a free radical initiator having a melt index, $I_2$, of less than 100 grams/10 minutes (preferably from 0.1 to 30 grams/10 minutes).

It is preferred that any polyethylene used in polymer composition A contains little or no comonomer. It is especially preferred that such polyethylene comprises at least 99 mole % ethylene. For clarity, this means that the preferred polyethylene contains at least 99 mole % of polymer units obtained from ethylene and less than or equal to 1 mole % of polymer units obtained from optional comonomer.

It is essential that the starting particle size of any polyethylene used in polymer composition A be from 1 to 400 microns (preferably from 1 to 200 microns), where the term "starting" refers to the particle size before blending with polyolefin B.

As previously noted, it is essential that polymer composition A is from 60 to 90 weight % of the total weight of (polymer composition A) plus (polyolefin B). It is highly preferred that the EVA copolymer in polymer composition A is at least 10 weight % of the total weight of (polymer composition A) plus (polyolefin B), more preferably from 10 to 50 weight % and especially from 20 to 40 weight %.

Polyolefin B has a melting point as determined by DSC of less than 70° C. Examples of suitable materials for polyolefin B include very low-density polyethylene (a copolymer of ethylene and at least one $C_4$ to $C_8$ alpha olefin such as butene, hexene or octene) having a density of less than 0.900 g/cc (especially less than 0.885 g/cc); ethylene-vinyl acetate; and atatactic polypropylene. Very low-density polyethylene ("VLDPE") is especially preferred. Highly preferred VLDPE has a melt index, $I_2$, of from 1 to 500 g/10 minutes and a modulus (as determined by ASTM D638 at 508 mm/minute) of from 0.1 to 10 MPa, especially 0.1 to 5 MPa.

The cover stock is prepared by blending from 60 to 90 weight % of polymer composition A (preferably from 70 to 80%) and from 40 to 10 weight % of polyolefin B (preferably from 30 to 20%). The cover stock is generally provided in the form of a film having a thickness of from 0.5 to 20 mils.

Preparation of Labels from Cover stock

The cover stock of this invention serves two purposes:
1) it covers and protects the graphics of the in-mold label; and
2) it serves to adhere the label to the mold surface prior to molding operations.

The graphics for the label are provided by way of a "graphics film". In the simplest (and most preferred) form, the graphics film is a printed sheet. The sheet is made from a material that is resistant to and compatible with the molding process. Examples of suitable materials include paper, synthetic papers (such as the synthetic papers sold under the trademarks TESLIN by PPG Industries and ARTISAN by Daramic LLC) and polymer films, especially a polyolefin film such as a polyethylene film.

The use of synthetic papers such as Teslin® is preferred because they may be printed with a wide variety of inexpensive printers, as described in the examples.

A label according to this invention may be prepared by simply covering the "graphics sheet" with the "cover stock". In a preferred embodiment, a lamination layer is included between the graphics sheet and cover stock. The lamination layer serves to provide additional protection to the graphics and to improve the overall robustness of the label. The lamination layer is preferably from 0.5 to 10 (especially 1 to 5) mils thick and is preferably an inexpensive polymer film, especially a polyethylene or polypropylene film.

The lamination layer may also contain additives to improve the longer-term durability of the film, including: ultraviolet ("UV") blockers such as titanium oxide; UV absorbers; hindered amine light stabilizers (HALS); hindered phenols and phosphides. These additives may also be added to the polymers used to prepare the cover stock especially if the lamination layer is not included.

The layers of the finished film are preferably heat laminated together (at a temperature lower than the melting point of polymer composition A, so as to preserve the non-homogeneous morphology of the cover stock). (It will also be recognized by those skilled in the art that lamination temperatures above the melting point of polymer composition A may be used for very short time intervals while still maintaining the non-homogeneous morphology—provided that the total amount of enthalpy provided to the lamination process is not sufficient to fully melt the polymer composition A). Suitable techniques for heat lamination are described in the examples. As an alternative, the layers may be laminated together with an adhesive.

The label is then ready for use in a rotomolding process. The label is applied to an empty mold such that the cover stock of the label is against the mold surface. The mold is preferably warm (30-70° C.) for safe and easy application of the label. Alternatively, the label may be applied at an even higher temperature in order to improve molding efficiencies (by reducing the amount of time required to reheat the mold).

In order to ensure that the label adheres to the mold, the mold temperature should be above the temperature at which polyolefin B starts to become tacky (in general, above 30° C.). The use of a burnishing tool (such as a rubber roller) helps to ensure that the label is applied smoothly. Under these conditions, labels that are made with VLDPE (as the preferred polyolefin B) will typically be held firmly in place by the tackiness of the label against the main mold. However, in general, the label may also be peeled off and repositioned (prior to molding) if desired. The mold is then charged with a rotomoldable plastic (preferably polyethylene) and a rotomolded part is then prepared using any conventional rotomolding technique. The heat from the rotomolding process melts the polymer composition A material. Upon cooling, polymer composition A becomes non-tacky and thus allows the cover stock to easily release from the mold.

Further details are provided in the following non-limiting examples.

EXAMPLES

Part I: Preparation of Cover Stock

Example 1

Compression Molded Cover Stock

This example illustrates the preparation of a two phase polymer layer ("cover stock") by compression molding polymer composition A (containing a mixture of polyethylene and ethylene-vinyl acetate (EVA) copolymer) and polyolefin B at a temperature above the melting point of polyolefin B but below the melting point of polymer composition A (i.e. the polyethylene and ethylene vinyl acetate copolymer).

The compression molding was completed in a conventional press mold (sold under the trademark WABASH) equipped with two steel plates. The plates were coated with polytetrafluoroethylene ("TEFLON") film to facilitate release of the cover stock from the plates.

The polyethylene was purchased from Equistar with the following reported properties:
$I_2$: 10 grams/minute
Density: 0.952 g/cc
Peak melting point (m.p.): 134° C.
Average particle size: 20 microns The EVA copolymer was purchased from Equistar with the following reported properties:
$I_2$: 8.0 grams/minute
Density: 0.926 g/cc
Peak melting point (m.p.): 96° C.
Average particle size: 20 microns Polyolefin B was a VLDPE purchased from Dow Chemical with the following reported properties:
$I_2$: 5 g/10 minutes
Density: 0.865 g/cc
Peak m.p.: 35° C.

A blend of 35 weight % of the above polyethylene, 35 weight % of the above EVA copolymer and 30 weight % of the above polyolefin B was mixed at 80° C. in a small mix head blender, then compression molded at 80° C. to a thickness of less than 10 mils to prepare "cover stock CO-EVA-1".

Inventive "Cover stock CO-EVA-2" was prepared as above except the following amounts of the above described polymers were used: 50 weight % polyethylene, 20 weight % EVA copolymer and 30 weight % polyolefin B.

Comparative "Cover stock CO-LDPE-1" was prepared as above except the EVA copolymer was not used and the following material was included:

LDPE was purchased from Equistar with the following reported properties:
$I_2$: 4.7 grams/minute
Density: 0.923 g/cc
Peak melting point (m.p.): 110° C.
Average particle size: 20 microns The following component amounts were used in the preparation of CO-LDPE-1: 35 weight % polyethylene, 35 weight% LDPE and 30 weight % polyolefin B.

Example 2

Cover Stock from a "Solution-Slurry"

This example illustrates the preparation of a cover stock according to the present invention by the deposition of a solution-slurry of EVA copolymer, polyethylene and polyolefin B. The term "solution-slurry" is meant to indicate that one of the polymers (polyolefin B) is in solution while the others (polyethylene and EVA copolymer) are not fully dissolved.

The "solution-slurry" was prepared of 14 weight % of the polyethylene used in Example 1, 14 weight % of EVA copolymer (as per Example 1) and 12 weight % polyolefin B (as per Example 1) and 60 weight % of Isopar G solvent. The solvent slurry was prepared by first mixing all components except the EVA copolymer at 45° C. in an agitated vessel. Cooling the vessel to 25° C. and then adding the EVA copolymer and mixing. Under these mixing conditions the Isopar G is a solvent for polyolefin B but does not fully dissolve the polyethylene or the EVA copolymer.

The solution-slurry was coated from a slot die (set to a width of about 12 inches or about 30 cm) on to a film. The film was an adhesive lamination (polyurethane adhesive) of biaxially orientated polypropylene ("BOPP") film and polyester film. The total thickness of polymer/solvent coating was about 10 mils. The coated film was then dried by passing it through a continuous oven with an internal temperature of about 100° C. The final dry polymer coating (cover stock) on the film was about 6 mils. The cover stock film (with a peelable liner) was wound on to a cardboard core to provide a roll of the cover stock. This cover stock is referred to hereinafter as "CO-EVA-1-SC".

It is important to note that the internal oven temperature (100° C.) is below the peak melting point of the polyethylene (134° C.). The resulting cover stock film had a non-homogeneous morphology, with discontinuous, discrete particles of polymer composition A (i.e. EVA and polyethylene) being dispersed mostly in the continuous phase of polyolefin B. This morphology was confirmed using Atomic Force Microscopy (AFM), which showed discrete "islands" of polymer composition A dispersed in a continuous "sea" of polyolefin B. For clarity, these "islands" were visible (using AFM) as discrete particles having a particle size of less than 100 microns.

Part II: Graphics Films

"Graphics film" was prepared as follows: Synthetic paper (sold under the trademark Teslin SP-800) was printed using an ink-jet printer sold under the trade name Mutoh-Falcon II. This type of synthetic paper is opaque, so the printed graphics are only clearly visible from one side (referred to herein as the "top side" of the graphics film).

Part III: Preparation of Labels

Two and three layer films according to this invention were prepared according to the following general procedures.

Simple two layer films were prepared by laminating the cover stock directly to the graphics film (at a temperature lower than the melting point of the polyethylene).

Three layer films were prepared by laminating a "tie" layer between the cover stock and graphics film. The tie-layer (when used) was either a cover stock used as a tie-layer or a 3-layer co-extruded polyethylene film.

The 3-layer co-extruded polyethylene film was produced as a core layer and two skin layers. The core layer was a conventional low density polyethylene homopolymer ("LD") having a melt index, $I_2$, of about 4.5 g/10 minutes and a density of about 0.920 g/cc, (sold under the trademark LC-0522-A by NOVA Chemicals Incorporated of Pittsburgh, Pa.). The skin layers were LLDPE having a melt index, $I_2$, of about 1.6 g/10 minutes and a density of about 0.896 g/cc, (sold under the trademark AFFINITY™ PF1140G by Dow Chemical). Each of the two skin layers and the core layers were 1 mil for a total film gauge of 3 mils. This tie-layer is referred to hereinafter as "TL-1".

Two Layer Labels

Two layer labels were prepared by laminating "solution-slurry" coated cover stocks (prepared in the manner described in Part I) directly to graphics film (prepared in the manner described in Part II) in a conventional heat seal lamination sold under the trademark "GBC Heat Seal H600 Pro". Temperature settings between 100 and 115° C. were used. "Speed settings" on the lamination of 2 were used (corresponding to a sealing time estimated to be about one half second). For the cover stocks prepared by mixing and compression molding a thin polyester sheet was run under the cover stock to prevent the cover stock sticking to laminator heated rollers.

Three layer Films

Three layer labels were made as generally described above (i.e. "GBC Heat Seal H600 Pro" lamination; temperature: 100-115° C.; speed settings of 2 with the exception that the "tie-layer" was included between the cover stock and graphics film.

Part IV: Rotational Molding

Rotomolded polyethylene cubes having an in-mold label were prepared using an aluminum mold and a commercial rotomolding machine (sold under the trademark Ferry RS-160). The polyethylene used was a high density ethylene-octene copolymer resin having a melt index, $I_2$, of 5.2 g/10 minutes and a density of 0.937 g/cc. Each face of the cube was about 30 cm. The resin charge size was about 2 kg which provides a hollow molded cube having a wall thickness of about 0.13 inches (about 0.3 cm). The oven temperature was 520° F. and the oven time was about 15 minutes, followed by forced air cooling for about 23 minutes. No mold release was applied to the mold surface. Parts were easily de-molded at a temperature above 60° C.

The labels used in the experiments were applied directly to the mold surface, with the "cover stock" layer of the label in contact with the mold surface. A layer of wax was applied to the mold surface in the area where the label was applied, prior to placing the label in the mold. The wax used was an "alkene homopolymer wax" (trademark BYBAR, by Baker Petrolite). Excess wax was wiped off the mold surface with a cloth prior to positioning the label. Mold surface temperatures for label application were between 40 and 110° C.

Table 1 provides a summary of the assembled labels and the assigned results for blistering and delamination defects for the in-mold labeled rotomolded parts. All of the molded parts according to this example that have no blisters or no delamination, produced acceptable labels—with little or no adhesion of the cover stock to the mold surface, no delamination within the label and high quality images (i.e. clear label surfaces, without discoloration or blisters).

TABLE 1

| Experiment | Cover Stock | Tie-Layer | Blisters | Delamination |
|---|---|---|---|---|
| 1 | CO-EVA-1 | None | None | None |
| 2 | CO-EVA-1-SC | TL-1 | None | None |
| 3 | CO-EVA-1-SC | None | None | None |
| 4 | CO-EVA-2 | None | None | None |
| 5 | CO-LDPE-1 | TL-1 | Yes | None |

Comparative Example 1

A blend of 70% high density polyethylene (density 0.937 g/cc; melt index, $I_2$, 5.2 g/10 minutes; peak melting point greater than 100° C.) and 30% of the polyolefin B (a VLDPE, melt index, $I_2$, 5 g/10 minutes; density: 0.870 g/cc; melting point: 59° C.; 100% modulus: 2.3 MPa) was prepared at a temperature of above 200° C. The resulting blend was "homogeneous" due to the mixing temperature (i.e. it did not have the non-homogeneous morphology of the cover stock of this invention). A comparative cover stock was prepared by casting a film having a thickness of about 4 mils from this "homogeneous" blend. A comparative label was then prepared by laminating the comparative cover stock to graphics film 1 at 150° C. The resulting label did not adhere to the surface of the aluminum mold used in Part IV above (at 60° C., regardless of whether the mold surface was treated with wax of not).

Comparative Example 2

A blend of 30 weight % high density polyethylene (as per Comparative Example 1) and 70 weight % polyolefin B (also as per Comparative Example 1) was melt blended at 150° C. The resulting "homogeneous" blend was used to make a comparative cover stock by casting a 4 mil film. The comparative cover stock was laminated to graphics film 1 at a lamination temperature of 150° C. This comparative film adhered well to a 60° C. aluminum mold. However, after rotomolding a polyethylene cube (in the manner described in Part IV above), this comparative cover stock became stuck to the mold. Thus, in general, the "homogeneous" cover stock of Comparative Example 1 did not adhere to the mold and the homogeneous cover stock of this Comparative Example was stuck to the mold.

Comparative Example 3

An attempt was made to apply a layer of the "lamination layer" film (LD film, 2 mils thick, described in Part III above) to the aluminum mold at a temperature of 60° C. This film would not adhere to the mold surface (regardless of whether the surface was treated with wax or not).

Comparative Example 4

A hydrocarbon grease (sold under the trademark Apiezon H) was applied to the aluminum mold surface. A "lamination layer" film (LD film, 2 mils thick) was held in place by this grease. A rotomolded PE cube was then prepared as generally described in Part IV above. The grease discolored during the molding operation and produced an undesirable brown stain on the molded part.

Comparative Example 5

Comparative Example 4 was repeated using a silicone grease (trademark Dow Corning III) instead of the hydrocarbon grease. The resulting rotomolded part de-molded well and was not stained. However, the silicone grease left an undesirable residue on the molded part.

Comparative Example 6

A mixture of 25 weight % of the polyethylene used to prepare the "lamination layer" (of Part III) and 75 weight % canola oil was heated to 130° C. (above the melting point of the polyethylene). This produced a clear solution. Upon cooling, the polyethylene precipitated out of solution to form a viscous suspension. This viscous suspension was applied to the aluminum mold surface. Attempts to adhere a "lamination layer" to the so treated surface were not successful.

What is claimed is:

1. A process to make a two-phase polymer layer having a thickness of from 0.5 to 20 mils, said layer comprising:
   I) from 60 to 90 weight % of a polymer composition A having a peak melting point of greater than 85° C., wherein said polymer composition A is provided as particles having an average particle size of from 1 to 400 microns and wherein said polymer composition A consists of:
      i) an ethylene-vinyl acetate polymer having a melting point of greater than 85° C and optionally;
      ii) a polyethylene having a melting point of greater than 85° C.; and
   II) from 40 to 10 weight % of a polyolefin B having a peak melting point of less than 70° C., wherein said two-phase layer is characterized by having a morphology wherein said polymer composition A forms a discontinuous phase of discrete particles in a continuous phase of said polyolefin B;

said process comprising:
   I) forming a two-phase solvent-slurry by mixing said polymer composition A and said polyolefin B in a liquid which is a solvent for said polyolefin B and which is a non-solvent for said polymer composition A;
   II) depositing said solvent-slurry as thin coating on a non-stick surface; and
   III) removing said liquid so as to form a two-phase polymer layer having a thickness of from 0.5 to 20 mils, and wherein said polyolefin B is further characterized by having a density of less than 0.885 grams per cubic centimeter.

2. The process of claim 1, wherein said non-stick surface provides a peelable backing.

* * * * *